United States Patent [19]

Cortez

[11] 4,193,192
[45] Mar. 18, 1980

[54] BAND SAW

[76] Inventor: Jose L. Cortez, 9050 E. Jeff St., Bellflower, Calif. 90706

[21] Appl. No.: 903,901

[22] Filed: May 8, 1978

[51] Int. Cl.² ............................................. B23D 53/12
[52] U.S. Cl. ...................................... 30/380; 83/574; 83/817; 83/820
[58] Field of Search ............ 30/380; 83/820, 815–817, 83/574

[56] References Cited

U.S. PATENT DOCUMENTS

| 8,056 | 4/1851 | Hedge | 83/820 X |
|---|---|---|---|
| 340,964 | 4/1886 | Thomas | 83/816 |
| 3,621,894 | 11/1971 | Niksich | 30/380 |

Primary Examiner—J. M. Meister
Attorney, Agent, or Firm—Fulwider, Patton, Rieber, Lee & Utecht

[57] ABSTRACT

A band saw construction including a plurality of rollers defining a saw blade path which is continuously arcuate except for the straight cutting section. A friction belt drive with associated guide rollers provides the motive force for the saw blade. Tension on the saw blade is adjusted by means of a pivotal roller carriage which is adjustable with respect to the main frame of the band saw with the roller carriage being horizontally adjustable with respect to the main frame.

4 Claims, 8 Drawing Figures

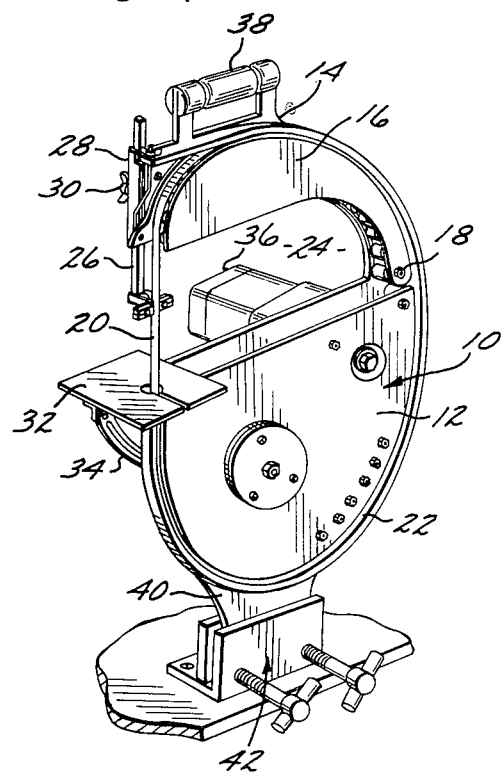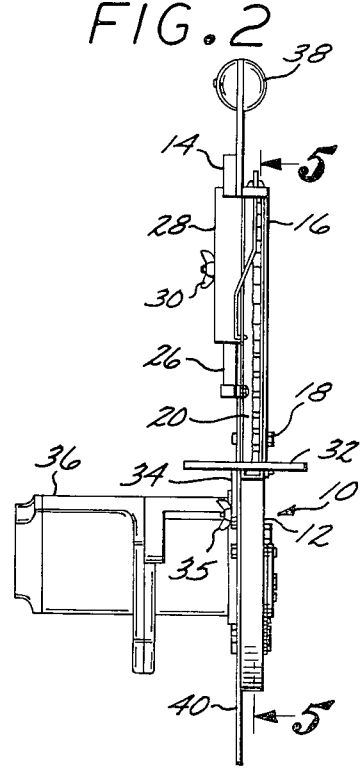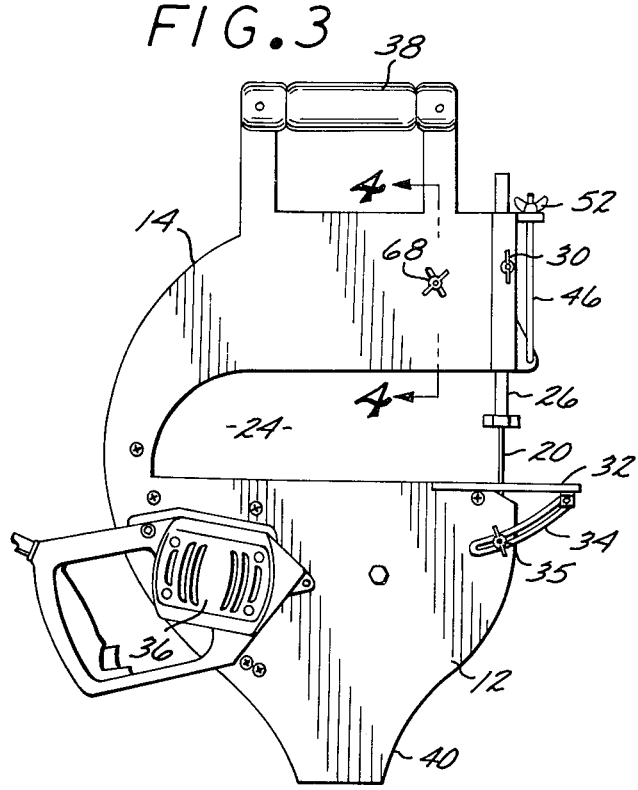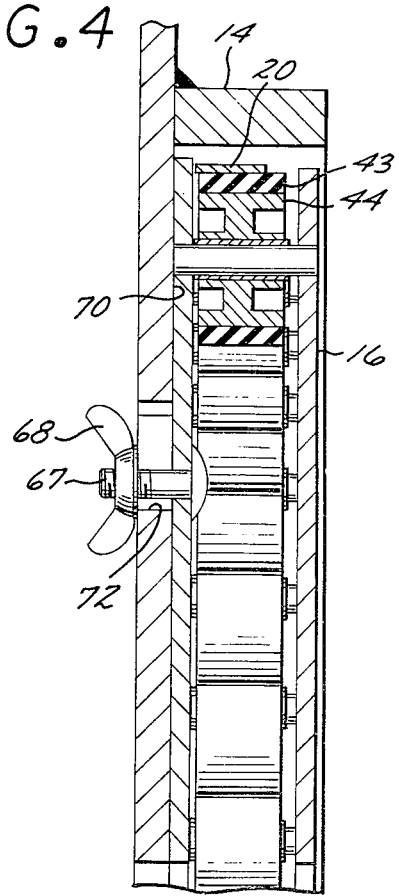

BAND SAW

BACKGROUND OF THE INVENTION

1. Field of the Invention

The present invention relates generally to band saws and, more particularly, to a short band saw with a relatively wide throat or work aperture.

2. Description of the Prior Art

In the past, band saw configurations have typically been rather large and complex machines designed for permanent or semi-permanent installation at a particular work site. In order to provide a relatively wide throat so relatively wide work pieces can be accepted, the band saw blade is run around a relatively long continuous path. When the path provided is be rectangular, the flexing of the saw blade at the turning corners seriously lessens the useful life of the blade due to metal fatigue. Thus, a number of band saw configurations provide relatively long arcuate paths for the blade either by the use of relatively large turning wheels such as that illustrated in Hedgpeth U.S. Pat. No. 2,274,923, or with a plurality of closely spaced rollers as illustrated in Holt U.S. Pat. No. 2,815,775 and Orescan U.S. Pat. No. 3,913,436, to decrease the total size of the saw. While such arcuate blade paths have been feasible for use in large permanently installed machines, such a construction has heretofore been too large and cumbersome for portable hand usable band saws and such portable saws have typically used blade paths with relatively sharp angular turns.

Thus, there has been a need in the field of band saws for a construction which decreased the turning angles of the blade path but were still small and lightweight. The present invention satisfies that need.

SUMMARY OF THE INVENTION

The present invention provides a band saw construction which combines a relatively wide throat and an arcuate saw blade path in a small and lightweight frame. The arcuate blade path is provided by a plurality of closely spaced rollers in the upper frame and by a combination of drive wheels and rollers which operate with a friction drive belt to drive the blade around the blade path.

Adjustment of the tension on the blade is effected by providing a roller carriage on the upper frame which pivots with respect to the lower frame to tension the saw blade. Further adjustment of the saw blade is provided by horizontal movement of the upper roller carriage with respect to the frame. Thus, the saw blade can be quickly tensioned and adjusted by means of a pair of wing nuts.

Further objects and advantages of the present invention will become apparent from a consideration of the following detailed description when taken in conjunction with the accompanying drawings.

BRIEF DESCRIPTION OF THE DRAWINGS

FIG. 1 is a perspective view of the band saw of the present invention;

FIG. 2 is a front elevational view of the band saw;

FIG. 3 is a side elevational view of the band saw;

FIG. 4 is an enlarged cross sectional view taken in the direction of lines 4—4 of FIG. 3;

DESCRIPTION OF THE PREFERRED EMBODIMENT

Figure 7:
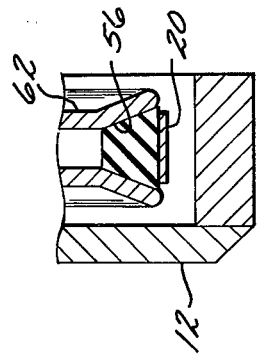
FIG. 7 is an enlarged cross sectional view taken in the direction of line 7—7 of FIG. 5.

Turning now to the drawing, particularly FIG. 1, the band saw of the present invention basically includes, generally, a somewhat circular frame 10 including a lower section 12 which houses a friction belt drive to be described below and an upper frame section 14 which pivotally houses a roller carriage 16. The roller carriage 16 is mounted on one end from a pivot pin 18 carried on the lower frame section 12. The roller carriage 16 is horizontally adjustable with respect to the lower section 12 of the frame 10 as will be further described below.

A band saw blade 20 wraps around a blade path 22 around the outer edges of the lower frame section 12 and the roller carriage 16 and is free at the open end of a throat 24 through which work pieces may pass. A saw guide 26 is telescopingly mounted within a channel 28 mounted on the upper frame section 14 and is adjustable by means of wing nut 30. A work table 32 is mounted on the outer end of the lower frame section 12 and its inclination may be adjusted by means of an electric motor 36 mounted on the back side of the lower frame section 12. One of the many advantages of the band saw of the present invention is that with the relative compact size and light weight thereof, it lends itself to portable use. Thus, it is provided with a handle 38 mounted on the top of the upper frame section 14 and is also provided with a mounting foot 40 on the lower end of the lower frame section 12. The saw may be mounted for semi-permanent installation by clamping the foot 40 in a vise 42 or the like.

Figure 5:
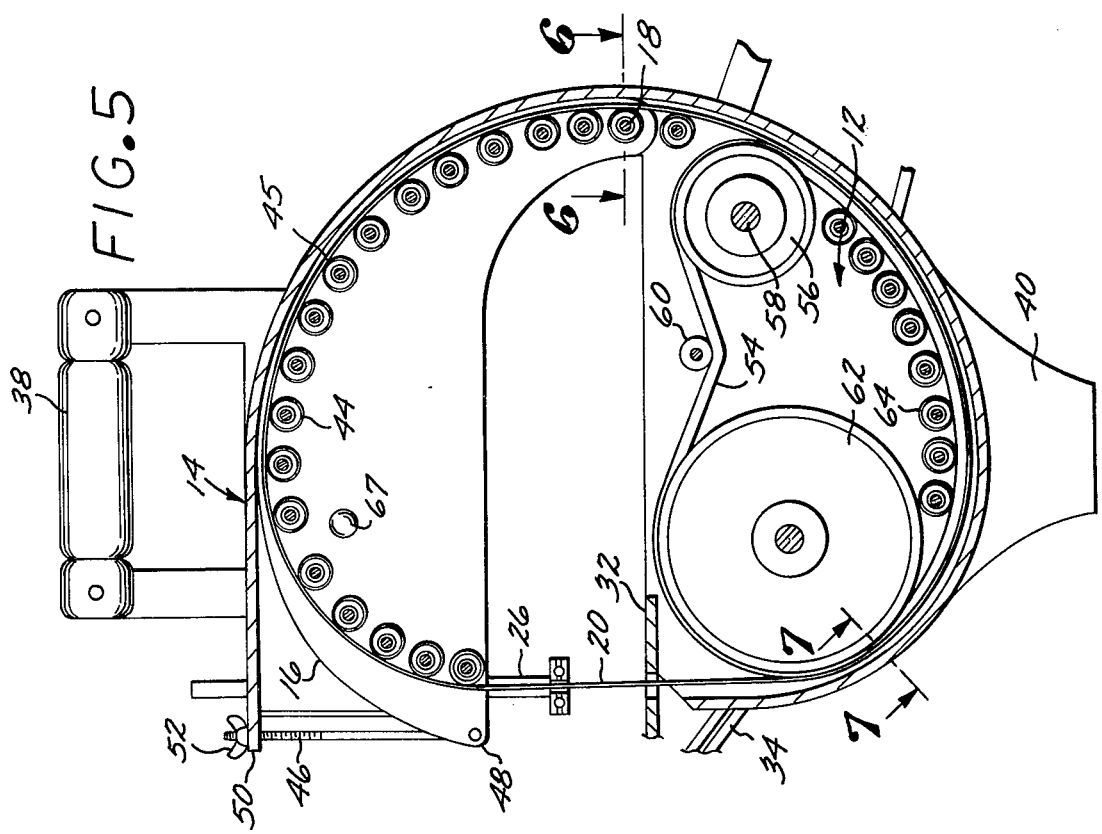
FIG. 5 is an enlarged side cross sectional view of the band saw taken in the direction of lines 5—5 of FIG. 2.

The internal construction of the portable band saw of the invention is best illustrated in FIG. 5. The roller carriage 16 has a plurality of rollers 44 (FIG. 9) mounted thereon. Such rollers 44 have rubber wheels 43 on their periphery and have their centers on a continuous line defining a relatively large center of curvature somewhat comparable to that for a conventional band saw of equivalent throat area but without the relatively large size and mass necessitated by conventional large diameter bull wheels or pulleys. The outer peripheries of such rollers 45 cooperate to define a series of tangent points 45 spaced apart a relatively short distance, for example, a distance of about two and one-fourth times the radius of such rollers to thereby minimize the bend or flex of the blade 20 as it bends over such tangent points 45 while still providing a large overall radius of curvature for such blade and consequent wide throat to accept large work pieces. It will be appreciated that in the preferred embodiment the return run of the blade path defines a near perfect semicircle having a diameter approximately the overall height of the saw.

The rollers on the upper front portion of the blade path cooperate to define quarter circles having a diameter of about one-half that for the circle defined by the rollers forming the return path. The rollers 44 are preferably about one and one-eighth inches in diameter and are about 17 in number and arrayed in a continuous line of curvature around the blade path from the level of the work table 32, around the top of the blade path and a short distance down the front side thereof to the vertical work run at the front to provide a throat width of eleven and one-fourth inches. The centers of rollers 44 are spaced apart a distance of one and one-fourth inches and are preferably sized and spaced apart a distance of 11% of the throat width and in no event a distance any greater than 15% thereof.

Figure 6:
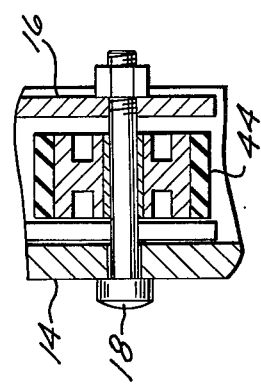
FIG. 6 is an enlarged sectional view taken in the direction of line 6—6 of FIG. 5.

As discussed above, the roller carriage 16 pivots about a pviot pin 18 at one end of the lower frame section 12, such pivot pin mounting on of the rollers 44 as shown in detail in FIG. 6. Adjustment of pivoting of the roller carriage 16 is effected by means of a rod 46 connected on one end to the free end 48 of the roller carriage and passing through an eye 50 formed in the upper frame section 14 (FIG. 5) and having a wing nut 52 screwed on the opposite extremity thereof.

The saw blade 20 is driven by means of a friction belt 54 driven by means of a drive pinion 56 connected by a shaft 58 to the motor 36. The friction belt 54 is fed under an idler 60 and then around a larger friction driven pulley 62. The belt 54 is then led around a plurality of closely spaced rollers 64 disposed in an arcuate profile drive pulley 56.

The saw blade 20 is led around the friction roller 62 in contact with the friction belt 54 past the rollers 64 and drive pinion 56 and thence into contact with the rollers 44 around their arcuate path and through the saw guide 26 into a cutting area immediately above the table 32 and back to the friction roller 62 as shown in FIG. 7. The tension on the saw blade 20 is adjusted by pivoting the roller carriage upwardly by turning the adjusting wing nut 52 on the upper frame section 14.

The horizontal position of the roller carriage 16 with respect to the lower frame section 12 is adjusted by means of a bolt 67 and wing nut 68 shown in FIG. 4. With wing nut 68 loosened, the roller carriage 16 is pivoted slightly away from the inside wall 70 of the upper frame section 14. The position of saw blade 20 on a roller 44 may be adjusted by tightening the wing nut 68 to bring the roller carriage 16 toward the inside wall 70 until the blade 20 is in the proper position. In order that the bolt 67 may move with the roller carriage 16, it rides in an elongated slot 72 as shown in FIG. 4. Thus, the tension on the blade 20 and its position on the rollers 44 within the roller carriage 16 may be adjusted simply by means of wing nuts 52 and 68, respectively.

Figure 8:
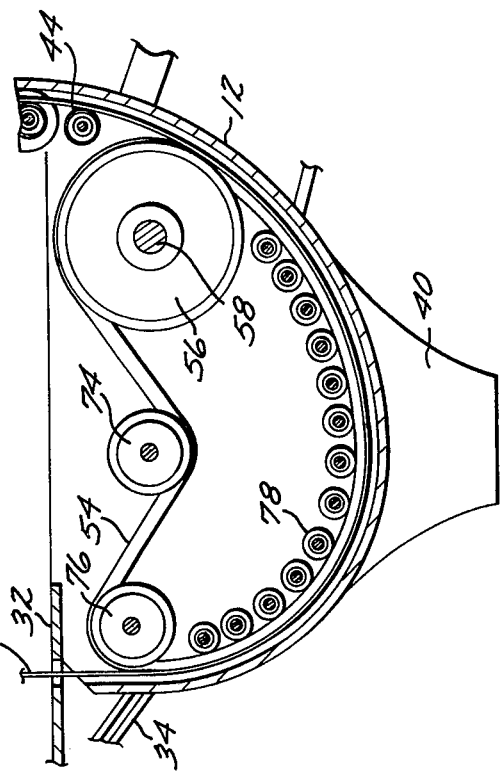
FIG. 8 is a side fragmentary cross sectional view of an alternate construction of the friction belt drive.

An alternate form for the drive mechanism for the friction belt drive is illustrated in FIG. 8 in which the belt 54 passes around a drive pinion 56 again connected to the motor 36 through shaft 50 but the belt 54 is then led around to idler pulleys 74 and 76 before being led to a plurality of spaced and arcuately arranged rollers 78. In this alternate form for the drive means, it will be appreciated that the belt 54 is in contact with the saw blade 20 almost entirely around an arcuate path defined by the rollers 78 which apply greater and more even forces against the belt 54 for greater frictional cotnact with the saw blade 20.

Thus, the band saw of the present invention provides not only a small and convenient size and shape but also provides for a substantially arcuate path of a saw blade 20 within the saw by means of a plurality of spaced rollers 44 arranged around an arcuate path. The tension on the blade 20 as well as its horizontal position on the rollers 44 are simply adjusted by means of wing nuts 52 and 68, respectively.

While a presently preferred embodiment of the invention has been described in detail above, it will be appreciated that many structural modifications are possible. Therefore, the invention is not to be limited, except by the following claims.

I claim:

1. A band saw comprising:
   a main frame having an upper and lower section;
   a pair of upper and lower roller carriages having a plurality of spaced and arcuately arranged rollers, said upper roller carriage being mounted from said main frame and adjustably connected to said upper section of said frame for lateral shifting with respect thereto;
   friction belt drive means mounted in said low section of said frame having a drive pinion, a friction pulley and a plurality of spaced and arcuately arranged friction rollers and a friction belt, said drive pulley, said friction pulley and said friction rollers defining an arcuately shaped friction belt path;
   adjustment means connected between said main frame and upper carriage for adjusting the lateral positioning of said upper carriage with respect to said lower carriage; and,
   an endless band saw blade positioned around said arcuately shaped friction belt path in said lower section of said frame and around said arcuately spaced rollers on said upper and lower roller carriages whereby said adjustment means may be adjusted to adjust the lateral position of said upper carriage relative to said lower carriage.

2. The band saw defined in claim 1 wherein:
   said frame is substantially disc shaped and has a space between said upper and lower sections defining a throat for receiving a work piece for said band saw.

3. The band saw defined in claim 1 wherein:
   said roller carriage is pivotally adjustably connected to said upper section of said frame by a rod connected between said roller carriage and said upper section of same frame ending with a threaded end through said upper section cooperative with an adjusting nut.

4. A band saw defined in claim 1 wherein:
   said adjustment means includes a bolt connected between said main frame and upper carriage, and a wing nut screwed onto said bolt.

* * * * *